United States Patent Office 3,317,883
Patented May 2, 1967

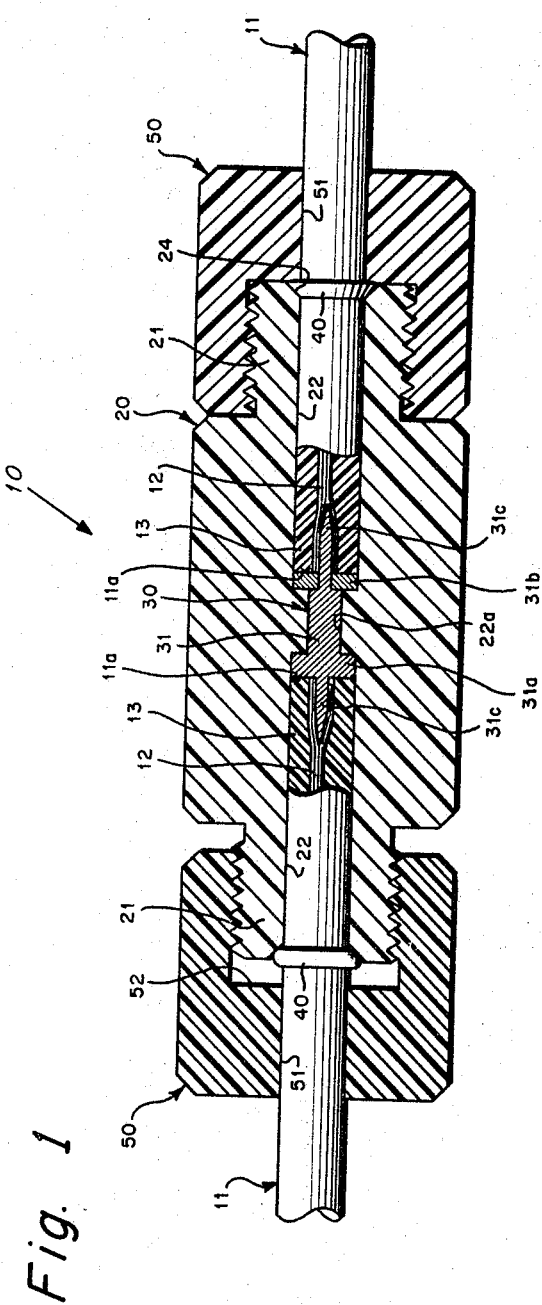
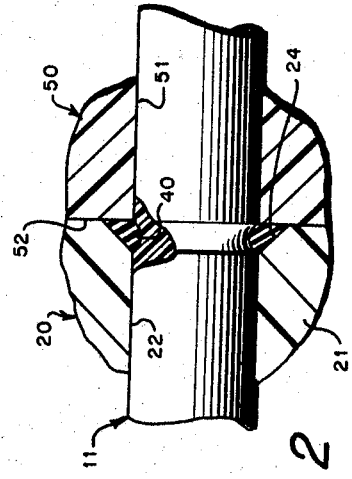
INVENTORS
WALTER C. GOURLEY
JAMES R. BELLACE
ATTORNEYS

3,317,883
HIGH VOLTAGE WIRE COUPLING
Walter C. Gourley, Oreland, and James R. Bellace, New Hope, Pa., assignors to the United States of America as represented by the Secretary of the Navy
Filed Mar. 31, 1965, Ser. No. 444,476
1 Claim. (Cl. 339—94)

The invention described herein may be manufactured and used by or for the Government of the United States of America for governmental purposes without the payment of any royalties thereon or therefor.

The present invention relates to wire connectors and more particularly to high voltage connectors for joining together the ends of flexible insulated wires having stranded conductors.

High voltage, in the order of 30,000 volts, is used in airborne radar devices. Stranded cable or conductors used therewith are covered with Teflon, a high dielectric strength material which precludes arcing. The high dielectric strength of this material allows the composite cable to be constructed of a diameter smaller than that required when another sheathing material is used. Obviously, wire couplings are required to facilitate removal of the various components to which the high voltage cables are connected for purposes of repair or the like. These couplings in addition to being easily and quickly disconnected must also provide efficient and reliable mechanical and electrical continuity therethrough. Since a high voltage coupling may be used in an environment where high humidity is present the coupling must further be air tight and water tight to preclude any corrosive action or electrical failure.

Prior art coupling devices have been found unsatisfactory in meeting the rigors of the above-mentioned environment. Specifically, high strength wire connectors utilize metal or other highly conductive material which is unsuited for a high voltage environment since arcing would exist. Additionally, the prior art couplings are of bulky construction in order to develop the dielectric strength necessary, a factor which is a deterrent to the use thereof in a location where space is at a premium.

It is therefore an object of the present invention to provide a high voltage wire coupling which can be connected and disconnected with facility and which will insure electrical and mechanical continuity.

Another object of the present invention is to provide a high voltage wire connector which will exclude moisture and which will thereby insure continued electrical and mechanical continuity.

An additional object of the present invention is the provision of a high voltage wire connector which may be applied without the need of special tools.

A still further object is to provide a high voltage wire coupling of light weight and small size which will exclude moisture and aid in the mechanical coupling of flexible insulated wires having stranded conductors.

Various other objects and advantages will appear from the following description of one embodiment of the invention, and the novel features will be particularly pointed out hereinafter in connection with the appended claim.

In the drawings:

FIG. 1 is a partial cross sectional view of the novel high voltage wire coupling with the left side thereof illustrated in an inoperative position.

FIG. 2 is a cross sectional view taken along the line 2—2 of FIG. 1.

In the illustrated embodiment of the invention, as viewed in FIGS. 1 and 2, the novel high voltage electrical coupling is generally indicated at 10 and is used to mechanically and electrically interconnect the ends 11a of high voltage cables 11. As viewed in FIG. 1, the cables are constructed of multiple strand conductors 12 encased by a resilient, tough, flexible, high dielectric strength plastic covering 13 such as Teflon or the like.

The coupling 10 per se includes a main body member 20 of cylindrical configuration having externally threaded reduced neck portions 21 at each end thereof. A cylindrical bore 22 extends coaxially inwardly from each end of the body member 20 and terminates centrally therein with an aperture 22a of reduced diameter. The cylindrical bore 22 terminates at the other end thereof in a frusto-conical bore 24 formed in the reduced neck portion 21.

A contact member generally indicated at 30 is positioned within the main body member 20 and has a barrel section 31 fitted within aperture 22a and terminating in a fixed shoulder 31a and a removable shoulder 31b positioned within the bore 22. Each of these shoulders terminate in a tapered projection 31c which extends into the ends 11a of the cable 11 and makes mechanical and electrical contact with the stranded conductors 12 formed therein.

An O-ring seal 40 of some elastomer, such as neoprene or the like, encircles each end of the cable 11 and movably grips the same. As viewed in FIG. 2, the volume of material of the O-ring seal 40 is slightly greater than the volume of the frusto-conical bore 24 thereby causing the seal 40, when compressed, to form an indentation on covering 13 of the cable and thereby form a mechanical interlock therewith.

An internally threaded cap 50 including a coaxial opening 51 therethrough in alignment with the bore 22 has threaded engagement with the externally threaded reduced neck portion 21 of the main body member 20. As viewed in FIG. 1 wherein the cap 50 on the left side of the figure is shown in the inoperative or non-compressing position, the cap 50 further includes a surface 52 which engages and compresses the seal 40 when the cap 50 is entirely threaded on the reduced neck portion 21. In response to the rotation of cap 50 the seal 40 becomes compressed and by reason of its firm connection with cable 11 merges the same in a direction toward the contact 31 creating a firm electrical and mechanical connection between the stranded conductors 12 and the tapered projections 31. When the cap 50 is entirely threaded with the neck portion 21, the seal 40 completely fills the frusto-conical bore and maintains a mechanical interlock with the covering 13 on the cable 11 thereby precluding the outward movement of the cable 11 from the coupling 10.

Each of the units 20 and 50 are formed of a resilient, flexible, tough, high dielectric strength plastic material such as Teflon or the like while the contact 30 is preferably constructed of bronze.

The ends 11a of cable 11 are connected by coupling 10 in the manner now to be described. First, cap 50 is placed on the free end of cable 11 and the seal 40 is then rotatably slipped on the free end of the cable. The cable is then positioned within bore 22 and forcibly urged against the tapered projection 31c until the latter penetrates and engages the stranded conductors 12. The seal 40 is then positioned adjacent the frusto-conical bore 24 and the cap 50 is rotated and threaded on the reduced neck portion 21. Continued rotation of the cap causes surface 52 to contact the seal 40 and compress the same into the bore 24 and to form a mechanical interlock between the seal 40 and the convering 13 on the cable 11.

It will be understood that various changes in the materials, steps and arrangement of parts, which have been herein described and illustrated in order to explain the nature of the invention, may be made by those skilled in the art within the principle and scope of the invention as expressed in the appended claim.

What is claimed is:

A hermetically sealed high voltage electrical coupling for connecting opposing ends of a pair of insulated stranded electrical conductors comprising in combination:

a flexible, resilient, tough, high dielectric strength body member made of Teflon and having coaxially extending thereinto from opposite ends thereof first and second short frusto-conical bores, said member having first and second cylindrical bores each being of a diameter to receive a respective one of the conductor ends and each coaxially extending from a respective said frusto-conical bore toward the other and terminating at an interior end spaced from that of the other, and said member having a third cylindrical bore being of a diameter smaller than those of said first and second cylindrical bores and coaxially extending between said interior ends of said first and second bores and forming communication therebetween;

a contact member formed of electrical conducting material, said contact member having a cylindrical portion received within said third cylindrical bore, one end of said portion terminating in a shoulder portion integral therewith and positioned within said first cylindrical bore in engagement with the interior end thereof, said contact member further having a first tapered projection integral with said cylindrical portion and said shoulder portion and extending from said shoulder portion into and coaxially of said first cylindrical bore, and said contact means further having a second tapered projection integral with said cylindrical portion and extending from said cylindrical portion into and coaxially of said second cylindrical bore, said oppositely extending tapered projections being for insertion within the ends of a respective one of the insulated stranded electrical conductors;

a removable shoulder portion member having an axial aperture and formed of electrically conducting material, said second tapered projection of said contact member being inserted through said aperture and engaging said removable shoulder portion member, and said removable shoulder portion member further being positioned within said second cylindrical bore in engagement with the interior end thereof;

a pair of O-ring sealing means each formed for encircling a respective conductor, positionable against the surface of a respective said frusto-conical bore and having a size slightly larger than the area of said respective frusto-conical bore when the conductors are inserted within said body member; and a pair of cap means made of Teflon and each having an aperture therethrough in axial alignment with said first, second and third cylindrical bores, each said cap threadably engaging said body member and including a surface portion cooperating with said sealing means for urging the same against the surface of a respective said frusto-conical bore and against the respective conductor depressing the surface thereof to form a mechanical interlock therewith in response to threading engagement;

whereby a hermetic seal is provided between the surface of each frusto-conical bore and the respective conductor and a good electrical connection is insured between the tapered projections and the conductors.

References Cited by the Examiner

UNITED STATES PATENTS

| 2,281,511 | 4/1942 | Parkin | 399—100 |
|---|---|---|---|
| 2,639,313 | 5/1953 | Street | 174—152 |
| 2,642,474 | 6/1953 | Bowar | 339—107 |
| 2,996,567 | 8/1961 | Channell et al. | 174—92 |
| 3,215,613 | 11/1965 | Lainson. | |

FOREIGN PATENTS

| 1,113,973 | 9/1961 | Germany. |
|---|---|---|
| 612,213 | 11/1948 | Great Britain. |
| 953,945 | 4/1964 | Great Britain. |

MARVIN A. CHAMPION, *Primary Examiner.*

EDWARD C. ALLEN, *Examiner.*

J. H. McGLYNN, *Assistant Examiner.*